US008977623B2

(12) United States Patent
Yang

(10) Patent No.: US 8,977,623 B2
(45) Date of Patent: Mar. 10, 2015

(54) METHOD AND SYSTEM FOR SEARCH ENGINE INDEXING AND SEARCHING USING THE INDEX

(75) Inventor: Hanfei Yang, Hangzhou (CN)

(73) Assignee: Alibaba Group Holding Limited (KY)

( * ) Notice: Subject to any disclaimer, the term of this patent is extended or adjusted under 35 U.S.C. 154(b) by 274 days.

(21) Appl. No.: 12/800,015

(22) Filed: May 5, 2010

(65) Prior Publication Data

US 2010/0287166 A1  Nov. 11, 2010

(30) Foreign Application Priority Data

May 8, 2009  (CN) .......................... 2009 1 0136443

(51) Int. Cl.
  *G06F 7/00* (2006.01)
  *G06F 17/30* (2006.01)
(52) U.S. Cl.
  CPC .... *G06F 17/30619* (2013.01); *G06F 17/30707* (2013.01); *G06F 17/30864* (2013.01); *G06F 17/30943* (2013.01)
  USPC .......................................................... 707/741
(58) Field of Classification Search
  None
  See application file for complete search history.

(56) References Cited

U.S. PATENT DOCUMENTS

| 5,895,470 | A | 4/1999 | Pirolli et al. |
| 5,920,854 | A | 7/1999 | Kirsch et al. |
| 6,253,198 | B1 | 6/2001 | Perkins |
| 6,278,992 | B1 | 8/2001 | Curtis et al. |
| 6,336,117 | B1 | 1/2002 | Massarani |
| 6,490,589 | B1 | 12/2002 | Weider et al. |
| 6,823,341 | B1 | 11/2004 | Dietz |
| 7,165,071 | B2 | 1/2007 | Fanning et al. |
| 7,277,574 | B2 | 10/2007 | Liu et al. |
| 7,340,454 | B2 | 3/2008 | Wu et al. |
| 7,373,351 | B2 | 5/2008 | Wu et al. |
| 7,464,072 | B1 | 12/2008 | Subramaniam et al. |
| 7,644,065 | B2 | 1/2010 | Wu et al. |
| 2002/0184380 | A1 | 12/2002 | Weider et al. |
| 2004/0024729 | A1 | 2/2004 | Worley |
| 2005/0289151 | A1* | 12/2005 | Burke .......................... 707/100 |
| 2006/0047719 | A1* | 3/2006 | Hershkovich et al. ........ 707/204 |
| 2007/0106662 | A1* | 5/2007 | Kimbrough et al. .............. 707/5 |

(Continued)

FOREIGN PATENT DOCUMENTS

| CN | 1584883 A | 2/2005 |
| JP | 2002245039 A | 8/2002 |

(Continued)

OTHER PUBLICATIONS

Witold Litwin et al: "LH*—Linear Hashing for Distributed Files", ACM SIGMOD Record, vol. 22, Jan. 1, 1993, pp. 327-336, XP055049230, ISSN: 163 5808, DOI: 10.1145/170035.170084 *sections 1-3*.

*Primary Examiner* — Rehana Perveen
*Assistant Examiner* — Raheem Hoffler
(74) *Attorney, Agent, or Firm* — Van Pelt, Yi & James LLP

(57) ABSTRACT

Data indexing includes receiving data from a data source; classifying the data into one of a plurality of categories according to a predetermined data classification criteria; establishing a corresponding relationship between the data and an index associated with the data, the index having a preset maximum capacity; and recording the relationship between the data and the index. The index is one of a plurality of indices, and each of the plurality of indices is exclusively written by an index writing device.

16 Claims, 4 Drawing Sheets

(56) References Cited

U.S. PATENT DOCUMENTS

2007/0244857 A1    10/2007   Yu
2008/0049276 A1    2/2008   Abe
2008/0319987 A1*   12/2008   Takuma et al. .................. 707/5
2010/0083101 A1*   4/2010   Denoual et al. ............... 715/242
2011/0047185 A1*   2/2011   Cho et al. ...................... 707/797

FOREIGN PATENT DOCUMENTS

JP          200852512 A    3/2008
WO         2007087629    8/2007

* cited by examiner

METHOD AND SYSTEM FOR SEARCH ENGINE INDEXING AND SEARCHING USING THE INDEX

CROSS REFERENCE TO OTHER APPLICATIONS

This application claims priority to People's Republic of China Patent Application No. 200910136443.2 entitled METHOD AND SYSTEM FOR IMPLEMENTING SEARCH SERVICE filed May 8, 2009 which is incorporated herein by reference for all purposes.

FIELD OF THE INVENTION

The present application relates to the field of computer technologies, particularly to a method and system for data search.

BACKGROUND OF THE INVENTION

Advancement in information technology is causing more and more information to be generated. Many ecommerce websites, for example, are seeing rapid increases in the volume of data generated by their users. To assistant people in finding their required information, search services are provided to enable a full-text search of data sources. The search can be based on keywords or descriptive information contained in a search query that is provided by a user. The search result will be returned to the user.

To implement the search service, a process of collecting, parsing, and storing data from data sources is commonly used to facilitate fast and accurate information retrieval; and such process is called search engine indexing. Since keywords provided by users for searching are usually in text format, the indexes for keyword searches are usually in text format as well.

A document to be indexed may be a webpage snapshot provided by a search engine, or a portion of a webpage snapshot. A webpage snapshot may have various formats. Some search engines support multiple document formats. The index may include various information from a data source; for example, if part of the content in the data source is textual, the index may include such text; if the data source file is in image, audio, or video formats, the index may have a field indicating the source of such file, for example, a field indicating the 8+file's web address.

An index server is often used to manage indices. When a user initiates a search, a query provided by the user is received by a search server. The search server determines which index has indexed the data required by the user and then looks up the query term(s) in the corresponding index and provides the user with the search result retrieved from the index.

To index massive amounts of data, website operators often use a number of index servers. The index may comprise a series of index data items and each data item is referred to as a document. Usually each document corresponds to a record in the source data. The index servers typically convert the records extracted from the source data into the indices. A major challenge in managing the indices is the management of parallel computing processes. There are many opportunities for race conditions and coherency faults. For example, multiple index servers may need to write to the same index file concurrently. In conventional implementation, to avoid incoherent faults, when one of the multiple index servers is writing data to the index file, other index servers are in an idle state and they may write data to the index file only after the first index server finishes writing data. Such behavior of writing to the same shared resource (e.g., the index file) by multiple index servers is referred to as writing sharing conflict. Thus, the conventional method may result in low performance and sharing conflicts during the indexing process.

Furthermore, during the query searching process, the sizes of the indices can affect the search efficiency. If the indices are too large, it may take a long time to look up the data; and if the indices are too small, accessing many indices may be required.

Therefore, a more efficient search engine indexing and searching method or system is need.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time, or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
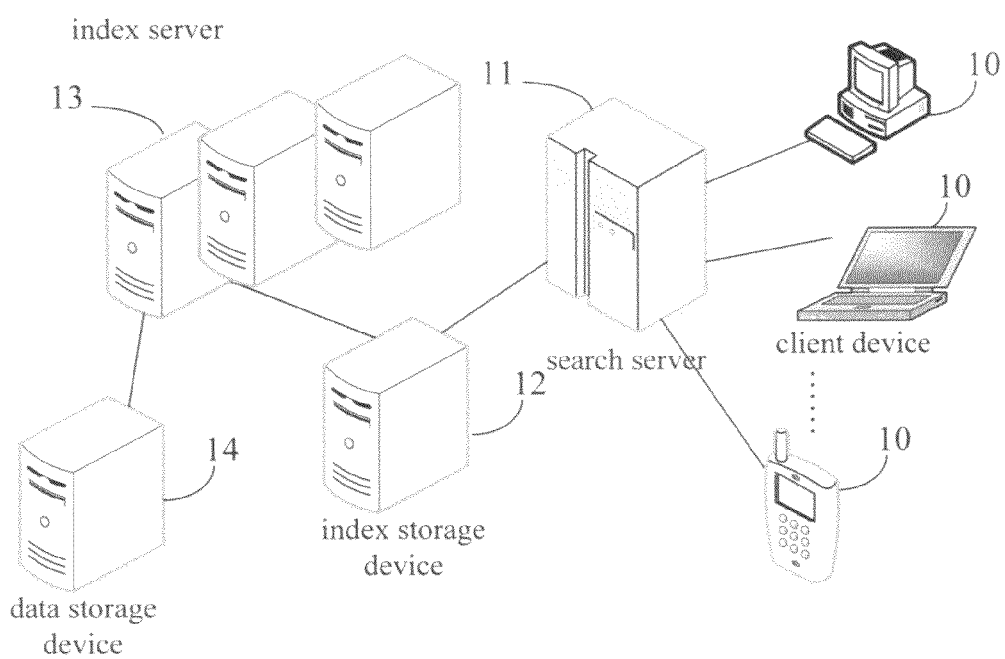
FIG. 1 is a schematic diagram illustrating a network deploying an embodiment of the search engine indexing system.

FIG. 1 is a schematic diagram illustrating a network deploying an embodiment of the search engine indexing system. In the example shown, a user accesses a search server 11 via a client device 10 that sends out search queries to the search server. The queries typically include keywords provided by the user for indicating types, ranges, or characteristics of the data desired by the user. For example, if the user wants to obtain all his or her emails from an email server, the keyword may be his or her email address; if the user wants to inquire information of a product, the keyword may be the name of one of its models. In some embodiments, there may be plurality of client devices 10 in the network, as shown in FIG. 1.

After receiving a search query, search server 11 analyzes the search query to obtain the keyword and determines which index should be used for looking up stored data. In some embodiments, the index is data arranged under certain rules that are created to match the search behavior of the users. For example, email messages may be stored in an email server. Data in email messages, including text of the emails and link addresses of files with non-textual formats in the emails, may be written to several preset indices, each of which may include emails associated with one or more email addresses. Furthermore, the search server also has a record of which index is used to look up for each email. Therefore, when the search server receives the search query to search for the user's emails, where the email address is provided in the search query, it is possible to determine the index under which the email address is arranged according to the email address and the record.

In the example shown, the indices are stored in an index storage device 12 connected to an index server 13. Index server 13 is used to generate indices based on data from a data storage device 14, according to certain rules. In some embodiments, a plurality of index servers are used. The indices generated are stored in index storage device 12. The data in the data storage device 14 may undergo changes over time. For example, the number of emails stored may increase over time. In the present embodiment, in order to conduct efficient searching, the capacity of each index is limited to be within a certain range. This is because it may take a relatively long time to search for data within a single index if the size of the single index is too large, or if there are numerous very small indices. In some embodiments, an upper limit is set according to the capacity of each index. In some embodiments, a part of the data from the data storage device 14 is selected as a data source of the index storage device 12 according to criteria such as data properties in a particular application and/or the performance of the search server 11. Since the data source has a capacity limit, a positive integer may be obtained by rounding up a value resulting from dividing the data source capacity limit by the upper capacity limit of the index. This value indicates the maximum number of indices for each data source if the data source stores data to its maximum capacity. Similarly, for other data in the data storage device 14, the maximum number of indices for each data source can be calculated.

Figure 2A:
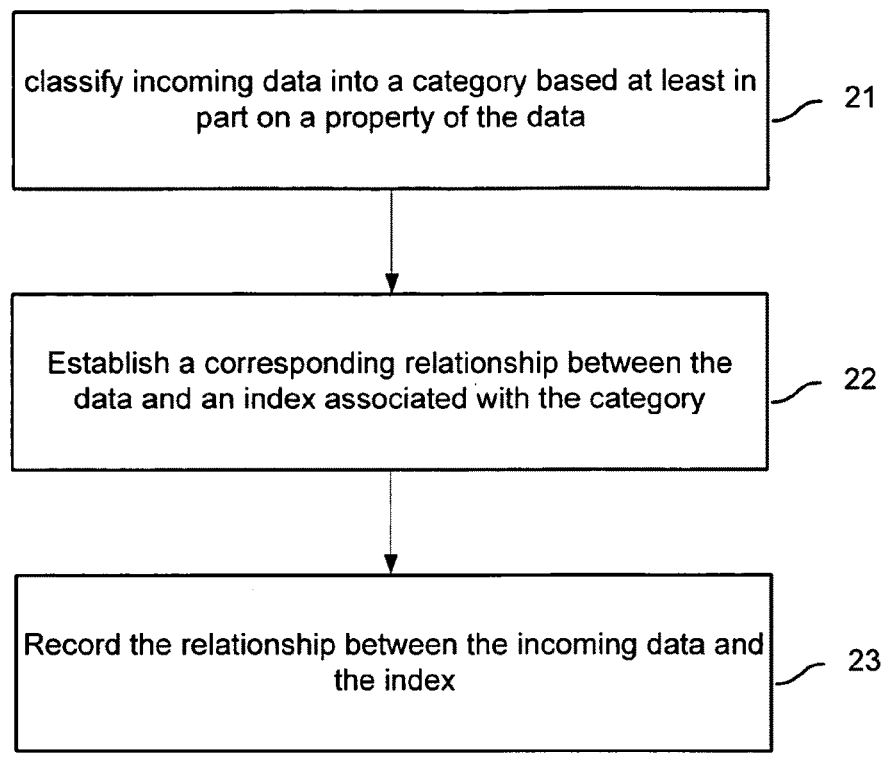
FIG. 2A is a flowchart illustrating an embodiment of a search engine indexing process.

FIG. 2A is a flowchart illustrating an embodiment of a search engine indexing process. An index is generated after this process is completed. The index includes information of the data in the data source; therefore, it is possible to provide a user with a query result according to the content of the index. When a search query is received from the user, an index is determined by the search server. Data is retrieved and sent back to the user according to the index. The data sent to the user may be text data or a web address of other data (image, video, audio, etc) in the data source.

At 21, data from a data source is received and classified into a category based at least in part on a property of the incoming data. In some embodiments, one or more predetermined rules are adopted for classifying the incoming data. These rules may be set according to properties of the data in the data source. For example, in some ecommerce platforms, order information and email information can be readily identified based on their different formats. Thus, order information and email messages are classified into separate categories. In some embodiments, a category is further classified into subcategories. For example, for a data source that includes emails of multiple users, the data may be classified into subcategories according to the email addresses of the users. The size of data in each category is configurable and is determined based on prediction of data growth in some embodiments.

At 22, a corresponding relationship between the data and a set of indices associated with the category is established. The number of indices corresponding to each category of data is set in advance by dividing the preconfigured category size by the maximum capacity of a single index. A larger index means more time may be required for looking up data in the index. A greater number of smaller indices can also require more time for data lookup since more time is needed to open the indices. Thus, in some embodiments, the maximum capacity of a single index is determined according to various performance metrics of the system, such as request/response time, rate of request processing, fluctuations in these performance metrics, etc. In various embodiments that employ different search techniques, for example, the maximum capacity of a single index ranges between 1-4 gigabytes.

Figure 2B:
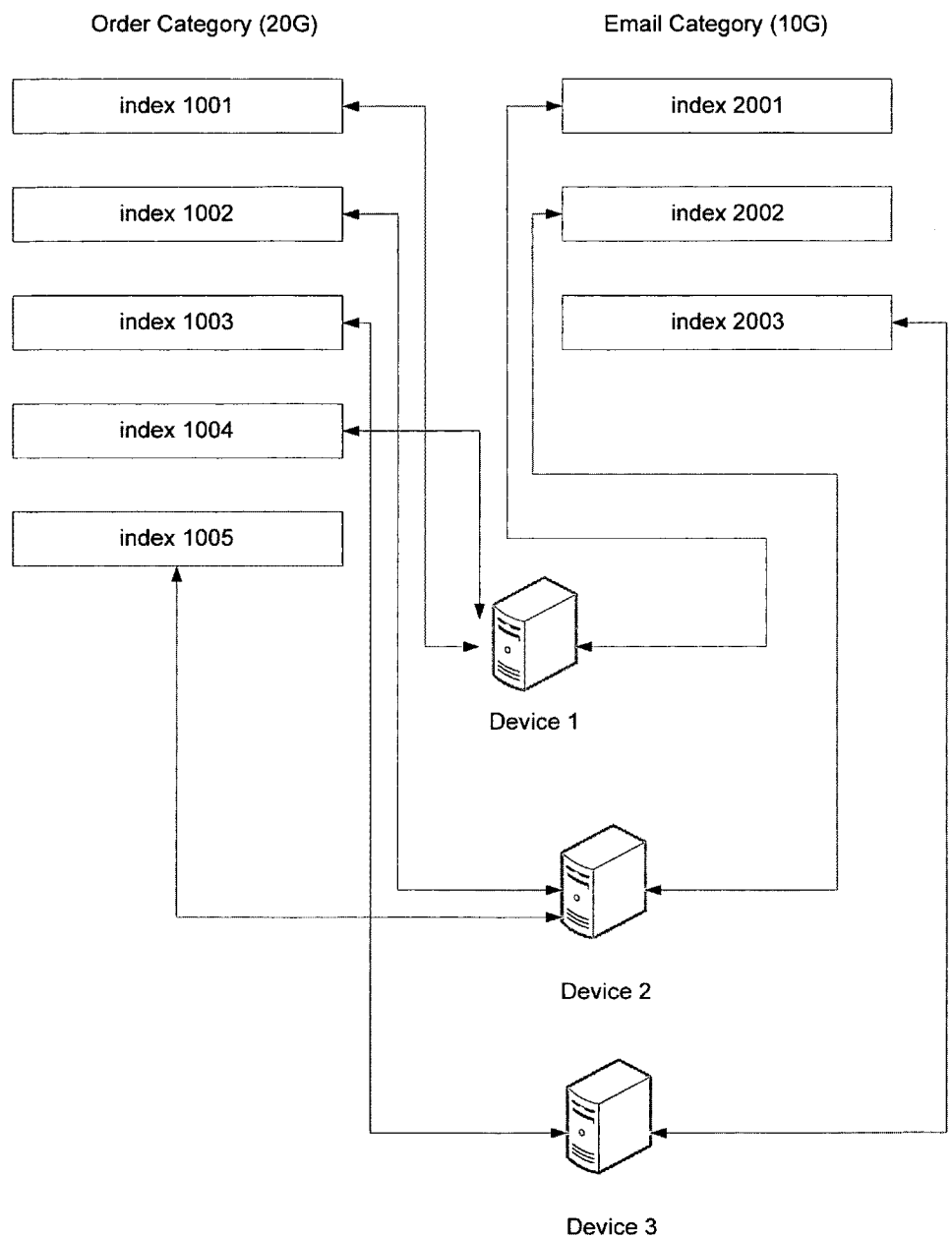
FIG. 2B is a diagram illustrating an example of indexed data.

Assuming that the total capacity of a category of data that can be stored in the data source is T and the maximum capacity of a single index is determined to be M, the number of indices corresponding to the category is calculated by rounding up the value if T divided by M. After the number of indices is determined, each of the indices may be assigned a serial number, which may be recorded in the index file or the filename of the index file. Referring to FIG. 2B, which is a diagram illustrating an example of indexed data. In this example, there are two categories of data: order category and email category. The maximum capacity of a single index is determined to be 4 gigabytes. The capacities of the order category and the email category are set to be 20 gigabytes and 10 gigabytes, respectively. Thus, 5 indices are associated with the order category and 3 indices are associated with the email category.

Various indexing techniques can be used to assign incoming data into the appropriate index. For example, a HASH based technique is used in some embodiments. Referring back to FIG. 2A, classified incoming data is assigned a unique integer. In some embodiments, the unique integer for incoming data is determined from a unique field found in the category of data. For instance, an incoming email message to be indexed includes a unique email address, which is extracted and mapped into digits according to a function, such as a mapping function using the ASCII code representing the address as parameters. An integer value may be also obtained by performing numeric operations on the obtained digits by using a HASH function or other appropriate techniques. In some embodiments, the unique integer value obtained for the incoming data is denoted as H and the number of indices of the category to which the incoming data belongs is denoted as N. An index for the current category is assigned a serial number equal to a value resulted from H % N, where H % N refers to the remainder obtained after dividing H by N. Thus, a corresponding relationship between an incoming data and an index is established. Returning to FIG. 2B for an example. Assuming that two incoming email messages to be indexed map to integer values of 35 and 57, respectively, since there are 3 indices that correspond to the email category, the messages are associated with index 2002 and index 2003, respectively.

Returning to FIG. 2A, at 23, the relationship between the incoming data and the index is recorded. In some embodiments, the relationship is recorded as an index entry included in the index, wherein each entry includes fields such as an identifier, stored content, etc. For example, an index entry of an email message may include one or more of the HASH value based on its sender address, subject, links of images or other resources included in the message, the text of the message, etc.

In some embodiments, a check is optionally performed to determine whether the total amount of data corresponding to the index exceeds the preset maximum capacity of the index. If index is exceeded, a new index is added and the amount of storage space dedicated to the category is increased.

In some embodiments, the incoming data and/or the index is saved by an index writing device such as an index server 13 of FIG. 1. To avoid a sharing conflict in index writing, each index is configured to be associated with, and therefore written by, only one index writing device.

To ensure that each category of data is allocated to the same index writing device, a process similar to step 22 may be used. For example, the index writing devices are labeled with consecutive positive integers (i.e., serial numbers), and the serial number of each index is divided by the number of the index writing devices to obtain a remainder, and data corresponding to the index may be allocated to the index writing device having the serial number equal to the remainder. An example is shown in FIG. 2B, where three devices (1, 2, and 3) are used to record indices of different categories of data. Other techniques for associating data with the index writing devices can also be used, as long as each category of data is associated with a single index writing device.

In some embodiments, the index writing device records information in the index as follows: first, data is extracted from the data source and the text in the extracted data from the data source and link addresses of files with other data formats in the extracted data are saved in text files stored on a data storage device; second, based on the relationships between categories associated with the data and the corresponding indices of the categories, data corresponding to the same index is stored in the same file and an identifier of the index writing device and an identifier of the index corresponding to the text file are recorded in the file or its filename. In some embodiments, the identifier of the index is the serial number of the index as described in step 22 of FIG. 2A and the identifier of the index writing device is the serial number of the index writing device as described in step 23. Here, both the file and the data from the data source are stored within the same storage device. Subsequently, a list of the extracted data files is recorded in a file status table, in which the filename and status of each file is stored. The status of a data file indicates whether the data has been written into an index, such as "Processed" or "Unprocessed." In some embodiments, the filename of the data file is in a format of {DATA PREFIX}_yyyy_mm_dd_hh_MM_ss_k.txt. The DATA PREFIX includes a description of the data and yyyy_mm_dd_hh_MM_ss denotes the year, month, date, hour, minute, and second when the data is extracted, and k denotes the serial number of the index writing device. The file status table may be stored in each index writing device. To perform data indexing, the index writing device looks up the file status table, reads a file corresponding to its own serial number from the storage device storing the files and writes data in the file to the corresponding index according to the identifier of the index recorded in the file or filename. The index writing device reads files in the chronological order. After the data is written into the index, the status of the file is recorded as "Processed" in the file status table.

The implementations of embodiments of systems for search engine indexing are described below. The systems are described to include a number of modules or units. The modules/units can be implemented as software components executing on one or more processors, or as hardware such as programmable logic devices and/or Application Specific Integrated Circuits designed to perform certain functions or combinations thereof. In some embodiments, the modules/units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules/units may be implemented on a single device or distributed across multiple devices. The functions of the modules/units may be merged into one another or further split into multiple sub-modules/sub-units.

Figure 3:
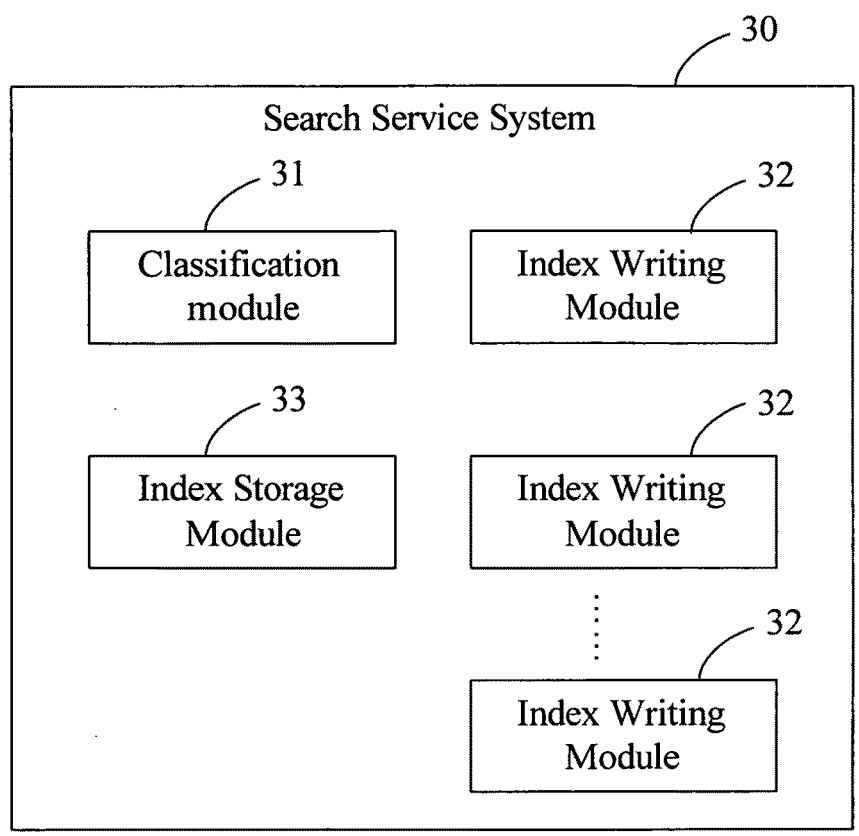
FIG. 3 is a block diagram illustrating an embodiment of a search engine indexing system.

FIG. 3 is a block diagram illustrating an embodiment of a search engine indexing system. A search service system 30 is used for implementing a search service and includes a classification module 31, an index writing module 32, and an index storage module 33. The search service system 30 may include one or more index writing modules 32 as shown in FIG. 3. The classifying module 31 is configured to categorize data received from a data source according to a predetermined data classifying scheme described in FIG. 2A. A correspondence relationship between each category of data and the preset index is stored, where each category of data corresponds to only one index. The index writing module 32 has all the functions of the index writing devices described in step 23 of FIG. 2A; that is, the index writing module 32 may write each category of data into an index according to the relationship stored in the classifying module 31. The index storage module 33 may be configured to store the index.

The search engine indexing system 30 may optionally include an allocating module configured to allocate each category of data to the index writing device so that each category of data is allocated to only one index writing module. Accordingly, the index writing module 32 may be further configured to write each category of data to its corresponding index according to the relationship stored in the classifying module 31. In addition, the search engine indexing system 30 may further include a source data storage module which is configured to store data in the data source. The search engine indexing system 30 may further include a search module configured to receive a search query, determine an index to be searched within the index storage module 33 according to the received search query and return the search result using the index. Typically, the search query is from a terminal operated by the user.

In some embodiments, the classification module 31 may further include an index number determining unit, an index numbering unit, a classifying unit, a characteristic value allocating unit, and an index corresponding unit. The index number determining unit is configured to determine the number of preset indices according to the capacity of the data source and the preset capacity of a single index. The index numbering unit is configured to label the preset indices with consecutive positive integers. The classifying unit is configured to classify the data in the data source according to the preset data classifying method. The characteristic value allocating unit is configured to allocate a unique integer value to each category of data obtained from the classification by the classifying unit. The index corresponding unit is configured to obtain the remainder resulted from classifying the integer value allocated to each category of data obtained from the division by the number of the preset indices and establish a correspondence relationship between the category of data and an index having a serial number equal to the remainder.

The index corresponding unit of the classifying module 31 may be further configured to record the serial number of the index which corresponds to each category of data. Thus, the data allocating unit may include an index determining sub-unit and a writing sub-unit. The index determining sub-unit is configured to determine the index corresponding to each allocated category of data according to the index's serial number and established relationship recorded in the index corresponding unit, and the writing sub-unit is configured to write data to the index determined by the index determining sub-unit according to each allocated category of data.

If the classifying module 31 has the structure as described above, the allocating module may include a device numbering unit and a data allocating unit. The device numbering unit is configured to label index writing modules using consecutive positive integers. The data allocating unit is configured to obtain the remainder resulted from classifying the serial number of each index by the number of the index writing modules 32 and allocate data to an index writing module 32 having a serial number equal to the remainder.

According to the embodiments of the application, data in a data source is classified and each of the categories of data obtained from the classification is mapped to an index and the data is written to the index according to such correspondence relationship. Thus, the sharing conflict in data writing may be avoided; furthermore, to obtain information of a certain category of data, a lookup may be performed within only a single index corresponding to the category of data. Thus, search efficiency can also be improved. Moreover, the capacity of the index is selected to not be too high or too low; thus, the low efficiency due to lookups in an excessively large index may be avoided and the need to open an excessive number of indices with small capacity can also be avoided. As a result, the search efficiency may be improved and hence the quality of the search service may be improved.

For easy description, the above system is divided into, according to functions, various modules, which are described respectively. However, the function of each module may be implemented in one or more software and/or hardware during the practice of the present application.

One skilled in the art should understand that the embodiments of this application may be provided as a method, a system, or a computer product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM, flash, and optical storages) containing computer-usable program codes. Those program codes include instructions to make a computer apparatus execute full or partial embodiments of methods described above.

The respective embodiments of the present application are described one by one, the same and similar parts of the embodiments are made by reference, and in each embodiment is emphasized the difference from other embodiments. Specifically, the system embodiments are described briefly due to similarity to the method embodiments and relevant modules of the system embodiments are made with reference to the method embodiments.

The present application may be applied to many universal or dedicated computing system environments or configurations, for example, a personal computer, a server computer, a handset or a portable device, a flat panel device, a multiprocessor system, a microprocessor-based system, a set top box, a programmable consumer electric device, a network PC, a minicomputer, a large scale computer, a distributed computing system including any one of the above systems or devices, etc.

This application is described referring to the flow chart and/or block diagram of the method, system, and computer program product according to the embodiments of this application. It should be understood that each flow and/or block in the flow chart and/or block diagram, and the combination of flows and/or blocks in the flow chart and/or block diagram may be realized in computer program instruction. In fact, the entire application may be described in a general context of a computer executable instruction that is executed by a computer, for example, a program module. Generally, the program module includes routines, programs, objects, components, data structures, etc., for executing a specified task or implementing a specified abstract data type. Alternatively, the present invention may be implemented in a distributed computing environment, where a remote processing device connected through a communication network executes the task. In the distributed computing environment, the program module may be located in a local or remote computer storage medium which includes a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for data indexing, comprising:
    receiving data to be indexed from a data source;
    classifying the data into one of a plurality of categories according to a predetermined data classification criteria;
    selecting an index of a plurality of indices associated with the category to which the data was classified;
    establishing a corresponding relationship between the data and the index, the index having a preset maximum capacity associated with an upper limit on an amount of data to be stored at the index; and
    recording the relationship between the data and the index, wherein the index is configured to be exclusively written by a corresponding index writing device, wherein recording the relationship between the data and the index includes:
        storing at least a portion of the data in a file associated with the index; and
        storing an identifier associated with the index and an identifier associated with the corresponding index writing device in at least a portion of the file associated with the index.

2. The method of claim 1, further including:
    receiving a search query;
    determining an index in the plurality of indices that corresponds to the received search query; and
    outputting stored data associated with the determined index.

3. The method of claim 1, further including determining a number of the plurality of indices based at least in part on a capacity of the category and the preset maximum capacity of the index.

4. The method of claim 1, wherein establishing the corresponding relationship between the data and the index includes labeling the plurality of indices with consecutive positive integers.

5. The method of claim 1, wherein:
the index writing device is one of a plurality of index writing devices; and
recording the relationship between the data and the index includes:
labeling the plurality of index writing devices with consecutive positive integers;
dividing a serial number of the index by the number of the index writing devices to obtain a remainder value; and
associating the data and the corresponding index writing device that has a serial number that is the same as the remainder value.

6. The method of claim 1, wherein classifying the data into one of the plurality of categories is based at least in part on a property of the data.

7. The method of claim 1, further comprising storing the file and the data in a storage device.

8. The method of claim 1, wherein prior to recording the relationship between the data and the index, further comprising:
determining whether a total amount of data stored at the index exceeds the preset maximum capacity;
wherein in the event that the total amount of data stored at the index does not exceed the preset maximum capacity, recording the relationship between the data and the index,
wherein in the event that the total amount of data stored at the index does exceed the preset maximum capacity, adding a new index to the plurality of indices associated with the category and establishing a corresponding relationship between the data and the new index, and recording the relationship between the data and the new index.

9. A system for data indexing, comprising:
one or more processors configured to:
receive data to be indexed from a data source;
classify the data into one of a plurality of categories according to a predetermined data classification criteria;
select an index of a plurality of indices associated with the category to which the data was classified;
establish a corresponding relationship between the data and the index, the index having a preset maximum capacity associated with an upper limit on an amount of data to be stored at the index; and
record the relationship between the data and the index, wherein the index is configured to be exclusively written by a corresponding index writing device, wherein recording the relationship between the data and the index includes:
storing at least a portion of the data in a file associated with the index; and
storing an identifier associated with the index and an identifier associated with the corresponding index writing device in at least a portion of the file associated with the index;
and
one or more memories coupled to the one or more processors, configured to provide the processors with instructions.

10. The system of claim 9, wherein the one or more processors are further configured to:
receive a search query;
determine an index in the plurality of indices that corresponds to the received search query; and
output stored data associated with the determined index.

11. The system of claim 9, wherein the one or more processors are further configured to determine a number of the plurality of indices based at least in part on a capacity of the category and the preset maximum capacity of the index.

12. The system of claim 9, wherein establishing the corresponding relationship between the data and the index includes labeling the plurality of indices with consecutive positive integers.

13. The system of claim 9, wherein:
the index writing device is one of a plurality of index writing devices; and
recording the relationship between the data and the index includes:
labeling the plurality of index writing devices with consecutive positive integers;
dividing a serial number of the index by the number of the index writing devices to obtain a remainder value; and
associating the data and the corresponding index writing device that has a serial number that is the same as the remainder value.

14. The system of claim 9, wherein classifying the data into one of the plurality of categories is based at least in part on a property of the data.

15. The system of claim 9, wherein one or more processors are configured to store the file and the data in a storage device.

16. The system of claim 9, wherein prior to recording the relationship between the data and the index, the one or more processors are configured to:
determine whether a total amount of data stored at the index exceeds the preset maximum capacity;
wherein in the event that the total amount of data stored at the index does not exceed the preset maximum capacity, record the relationship between the data and the index,
wherein in the event that the total amount of data stored at the index does exceed the preset maximum capacity, add a new index to the plurality of indices associated with the category and establish a corresponding relationship between the data and the new index, and record the relationship between the data and the new index.

* * * * *